United States Patent
Apel et al.

(10) Patent No.: US 9,213,228 B2
(45) Date of Patent: Dec. 15, 2015

(54) DEVICE AND METHOD FOR MEASURING A CAMERA

(71) Applicant: ROBERT BOSCH GMBH, Stuttgart (DE)

(72) Inventors: Uwe Apel, Neckartailfingen (DE); Carina Raizner, Noerdlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/369,845

(22) PCT Filed: Dec. 18, 2012

(86) PCT No.: PCT/EP2012/075893
§ 371 (c)(1),
(2) Date: Jun. 30, 2014

(87) PCT Pub. No.: WO2013/102555
PCT Pub. Date: Jul. 11, 2013

(65) Prior Publication Data
US 2015/0138372 A1 May 21, 2015

(30) Foreign Application Priority Data
Jan. 5, 2012 (DE) .......................... 10 2012 200 152

(51) Int. Cl.
*H04N 17/00* (2006.01)
*H04N 17/02* (2006.01)
(Continued)

(52) U.S. Cl.
CPC .............. *G03B 43/00* (2013.01); *G02B 27/30* (2013.01); *G02B 27/36* (2013.01); *G02B 27/62* (2013.01); *H04N 17/002* (2013.01)

(58) Field of Classification Search
USPC ......... 348/187, 180, 188, 142, 88, 46, 49, 50, 348/42, 222.1, 266, 345, 349, 771, 783; 359/223.1, 224.1, 224.2, 225.1, 226.1, 359/641, 642, 726, 730, 838, 844, 852, 866, 359/872; 250/363.1, 368, 559.29
See application file for complete search history.

(56) References Cited

U.S. PATENT DOCUMENTS 4,513,319 A * 4/1985 Breimer et al. ................ 348/188
5,082,364 A * 1/1992 Russell ........................ 356/5.15
(Continued)

FOREIGN PATENT DOCUMENTS

| DE | 102004010958 | 9/2005 |
| GB | 2420239 | 5/2006 |

(Continued)

OTHER PUBLICATIONS

International Search Report for PCT/EP2012/075893, issued on May 13, 2013.

*Primary Examiner* — Jefferey Harold
*Assistant Examiner* — Mustafizur Rahman
(74) *Attorney, Agent, or Firm* — Kenyon & Kenyon LLP

(57) ABSTRACT

A device and a method are described for measuring a camera having an image sensor, in particular a fixed-focus camera, the device including: a camera support for accommodating at least one camera to be tested in at least one camera position, a collimator device for emitting collimator light of a test pattern having different object distances, a mirror system for deflecting the collimator light to the camera position, the mirror system having at least one first mirror device which is pivotable by a mirror adjustment device into multiple pivot positions, and a second mirror device having multiple second mirror units, the second mirror units reflecting the light emitted by the first mirror device in its different pivot positions to the camera position for imaging the test pattern in different image regions of an image sensor.

21 Claims, 4 Drawing Sheets

(51) Int. Cl.
*G03B 43/00* (2006.01)
*G02B 27/62* (2006.01)
*G02B 27/36* (2006.01)
*G02B 27/30* (2006.01)

(56) References Cited

U.S. PATENT DOCUMENTS

| | | | |
|---|---|---|---|
| 5,111,056 A | * | 5/1992 | Yoshimura et al. ...... 250/559.23 |
| 5,180,922 A | * | 1/1993 | Hug .......................... 250/559.38 |
| 5,815,251 A | * | 9/1998 | Ehbets et al. ................. 356/5.01 |
| 5,870,142 A | * | 2/1999 | Noda et al. .................... 348/266 |
| 5,877,885 A | * | 3/1999 | Suda et al. ................. 359/201.1 |
| 6,034,794 A | * | 3/2000 | Suganuma .................... 358/518 |
| 8,520,192 B2 | * | 8/2013 | Goering ....................... 356/5.01 |
| 2001/0017697 A1 | * | 8/2001 | Kanda et al. .................. 356/512 |
| 2005/0212951 A1 | | 9/2005 | Miyata et al. |
| 2006/0103754 A1 | * | 5/2006 | Wenstrand et al. ........... 348/349 |
| 2007/0002143 A1 | * | 1/2007 | Elberbaum ................... 348/188 |
| 2009/0095047 A1 | * | 4/2009 | Patel et al. ..................... 73/1.01 |
| 2009/0122151 A1 | * | 5/2009 | Katsuyama ................ 348/222.1 |
| 2010/0020180 A1 | * | 1/2010 | Hill et al. ...................... 348/188 |

FOREIGN PATENT DOCUMENTS

| | | |
|---|---|---|
| GB | 2426813 | 12/2006 |
| GB | 2460654 | 12/2009 |
| WO | WO2011/059122 | 5/2011 |

* cited by examiner

DEVICE AND METHOD FOR MEASURING A CAMERA

BACKGROUND INFORMATION

Cameras which are used in driver assistance systems of vehicles are generally manufactured in a fixed-focus design, i.e., having fixed focusing. These cameras must be checked for a correct alignment of the image plane of the objective with the surface of the image sensor. For this purpose, a test pattern is generally recorded at various positions in the image field, which is projected by a motor-tunable collimator from various virtual object distances. The distance range may respectively be varied in multiple steps between infinite and 2 m in order to ascertain the object distance at which the test object is focused. An MTF (modulation transfer function) is advantageously calculated as a measure of the contrast for each position and for each object distance from the definable pulse response in the recorded image of the test pattern. The tuning of the object distance is also referred to as a through-focus scan.

The cameras are generally to be focused in such a way that the depth of field range reliably covers the relevant distance range for the driver assistance function. Generally, objects at a large distance and those at a shorter distance are to be imaged having sufficiently good contrast. This property is to be achieved at the different positions of the image field, i.e., including image regions which are farther apart, such as the corners of the imager and of the image provided by it.

The cameras are generally tested by rotating the camera and the collimator relative to each other in order to be able to record the test pattern in various image field positions. Thus, a support accommodating the camera or the collimator is rotatable or pivotable. Correspondingly, many runs of the tunable collimator are required at the different pivot positions.

If the camera to be tested or the collimator is rotated or tilted, an exact centering on the center of rotation of the alignment unit is required in each case. Generally, in such measurements, the test pattern is repositioned to another image field position as an external loop of the measuring procedure, and the through-focus scan is carried out as an inner loop, since the alignment of the test pattern is more time-consuming.

Measurements of this kind are therefore generally complex and require exact adjustments of the camera and/or the collimator in different pivot positions.

German Published Patent Appln. No. 10 2004 010 958 describes a device for manufacturing a camera, in which a first calibration field is accommodated in a support device and a second calibration field is provided for larger virtual object distances separately from the support device, the second calibration field being able to be detected by the camera via multiple mirror units accommodated in the support device. The position of the image sensor of the camera may be finely positioned using a hexapod robot. It is thus possible to implement larger regions of virtual object distances using the multiple calibration fields and the deflection device from the mirror units.

SUMMARY

The device according to the present invention for measuring a camera has multiple advantages relative to the related art. A mirror system having a pivotable first mirror device is thus provided in order to check various image regions or regions of the imager of the camera successively. By setting different pivot positions, a test pattern which is output by a collimator device may be directed toward the various image regions or regions of the imager chip without requiring an adjustment of the camera. An adjustable first mirror device directs the light output by the light-emitting device at different tilt angles to second mirror units of a second mirror device, which deflect this light to the camera or to the entrance pupil of the camera. The camera position is precisely defined by the camera support.

With regard to the optical light course, the camera position is understood to be in particular the position of an entrance pupil of the objective of the camera to be accommodated.

The camera may thus be accommodated in a fixed, non-adjustable camera accommodation. The camera accommodation may in particular be situated securely or rigidly with respect to a collimator accommodation and a second mirror device.

Thus, only the setting of different tilt angles of the first mirror device is required for measuring the imager or the camera, without tilting or pivoting the camera and/or the collimator as a whole. The first mirror device may in particular be pivoted about two offset axes, for example, pivot axes which are orthogonal to each other, in order to thus image the test patterns successively on the two-dimensional surface of the imager chip. The second mirror units are advantageously planar. The pivotable or tiltable first mirror device is also advantageously planar, so that the focusing takes place solely via the collimator device.

According to one particularly advantageous design, the second mirror units of the second mirror device are situated in such a way that the total length of the optical light path from the collimator device to the camera position or the entrance pupil of the camera is completely or at least essentially the same at the different pivot positions. For example, differences may be permitted within a tolerance value. The total length thus consists in particular of the light paths from the collimator device to the pivotable first mirror device, from there to the second mirror device, and from there to the camera. Such a design may in particular be carried out via a hemispherical and/or a rotational ellipsoid arrangement of the second mirror units. For this purpose, the second mirror units may be securely accommodated in a second mirror support, for example, embedded or rigidly secured.

A second mirror unit is advantageously provided for each pivot position, i.e., in particular different value pairs of two tilt angles, so that an exact matching of the optical path lengths may be carried out.

One particular advantage is that the mass to be pivoted may be kept small, since it is necessary to adjust only the first mirror device, which, for example, may be one single planar first mirror which is set at different tilt angles via a mirror adjustment device. The setting of different object distances or focuses may be carried out in a manner known per se using a focusable collimator device, which, however, may not be additionally pivoted.

Thus, the various cameras may be accommodated successively in the camera support and measured by setting different focuses and different tilt angles. These settings may be run through via an inner and an outer loop.

One additional advantage of the present invention is that, in contrast to conventional systems, the loop structure of the measuring procedure may be changed, so that the collimator runs through only one single through-focus scan in an outer loop, and the adjustable first mirror unit quickly sets the respective image positions in succession in an inner loop.

One additional advantage is that when adjusting the first mirror unit, which may be designed having a small mass and is quickly and precisely adjustable, the measurement may be carried out in a shorter testing period than when pivoting large masses such as the camera or the collimator device.

In addition to the measurement of identical cameras, cameras having a different aperture angle may also be measured. For this purpose, the second mirror device is advantageously designed having different mirror sets for the cameras having different aperture angles, i.e., generally having mirror units which are farther apart for cameras having a larger aperture angle. Such a second mirror device may thus be used for different cameras without having to replace, modify, or adjust it, with only a software adjustment having to be carried out for the control signals for controlling the mirror adjustment device and/or the adjustment device of the collimator device.

In addition to measuring monocular cameras, the measurement of stereo camera systems is also possible. Both individual cameras may be successively measured or checked on the one hand by setting different pivot positions, so that here as well, only the adjustment of the control signals must be carried out. The second mirror device advantageously has different mirror sets for both axes of the stereo camera system, which lie on hemispheres or paraboloids of revolution which are offset from each other. Thus, for such a design as well, only one shared second mirror device having fixed mirror sets is required, without having to change or replace the second mirror device.

Therefore, one advantage is that by using a second mirror device having multiple mirror sets for cameras having a different aperture angle and/or stereo cameras, more complex measurements are possible, in which only one configuration adjustment of the software is required for controlling the mirror adjustment device and/or the focus of the collimator device.

The adjustable first mirror unit may in particular have a first mirror which is tiltable about two axes. This may, for example, be implemented using a motorized two-axis unit. Alternatively, however, a combined system made up of two mirrors which are pivotable at various tilt angles, for example, galvanometer mirrors, may be implemented, which are already known per se, for example, in laser processing.

Furthermore, according to the present invention, defined climatic conditions may also be set. Multiple measurements may thus be set successively in different climatic conditions, i.e., the temperature or humidity for the camera to be tested. Since the camera may be accommodated in the camera support securely and without setting different pivot angles, problems of insulating a pivotable camera accommodation are eliminated. The securely accommodated camera may thus be subjected to different conditions without great effort.

An additional advantage is that only three axes, which may be set precisely by an evaluation and control device, must be motorized, namely, one axis for the through-focus scan of the light-emitting device or collimator device, and two pivot axes of the first mirror device. The calibration of the infinite position of the collimator, which is relevant to the measurement accuracy, is required only for one single collimator. Deviations for the various measuring field positions may be avoided.

The use of one single collimator having deflection of the test pattern onto the various measurement positions furthermore also simplifies the adjustment of the spectral design of the light source, which is indeed required, for example, for the measurement of night vision systems or image evaluation systems.

DETAILED DESCRIPTION

Figure 1:
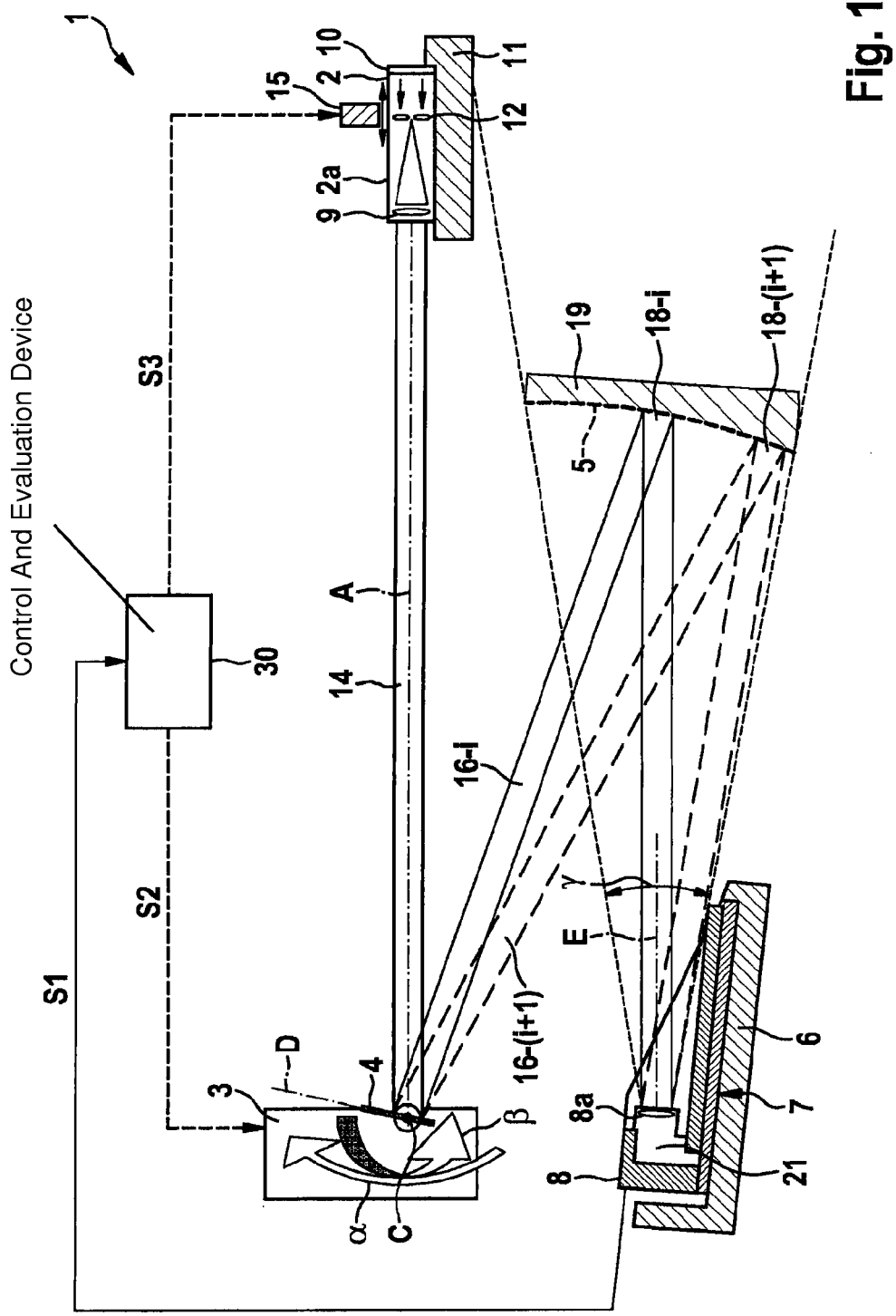
FIG. 1 shows a side view of a measuring device according to one specific embodiment.

According to FIG. 1, a measuring device 1 has a focusable collimator 2 acting as a collimator device, a mirror adjustment device 3 having a pivotably accommodated first mirror 4, a fixed second mirror device 5, and a camera support 6 having a camera 8 to be tested which is accommodated in a camera position 7.

Collimator 2 has, in a manner known per se: a housing 2a, an optics device 9, a light source, for example, in the form of an LED unit 10 in the rear area of housing 2a, and a test pattern 12 which is adjustable along optical axis A by an adjustment device 15 in housing 2a.

Optics device 9 is preferably an eyepiece (collective lens) having a fixed position in housing 2a. Test pattern 12 may, for example, be an etched plate or glass panel, for example, as apparent in the illustration in FIG. 3, a cross-shaped test pattern 12, which is illuminated from behind by LED unit 10 and thus appears toward the front, i.e., toward eyepiece 9, as a light-emitting object, which is subsequently to be imaged over the entire optical arrangement by camera 8. The various longitudinal positions of test pattern 12 in collimator 2 are thus used to represent different object distances which are to be imaged by camera 8 to be tested.

Collimator 2 or its collimator housing 2a is securely accommodated in a collimator accommodation 11 of measuring device 1. Adjustment device 15 for setting the focus of collimator 2 is thus adjustable with respect to collimator accommodation 11. Light 14 emitted by collimator 2 runs along optical axis A to pivotable first mirror 4. First mirror 4 is pivotable via mirror adjustment device 3 about two orthogonal pivot axes C and D, neither of which runs parallel to optical axis A. The respective pivot positions of first mirror 4 are not orthogonal to optical axis A, so that incident light 14 is not reflected directly to collimator 2, but rather to second mirror device 5. Pivot axes C and D advantageously run parallel to first mirror 4. Instead of one single mirror which is pivotable about two pivot axes C and D, a mirror device having two first mirrors which are pivotable about each pivot axis may also generally be provided.

First mirror 4 is preferably planar. In the illustration in FIG. 1, pivot axis C is perpendicular to the image plane, and the other pivot axis D is in the image plane.

First mirror 4 reflects incident light 14 corresponding to its pivot positions in different directions as light paths 16-1, 16-2, i.e., 16-$i$, where i=1, 2, 3, . . . ; light paths 16-$i$ and 16-($i$+1) are shown in FIG. 1 by way of example. Each light path 16-$i$ is directed to a second mirror unit 18-$i$ of second mirror device 5, where i=1, 2, . . . . Individual second mirror units 18-1, 18-2, . . . are advantageously in turn planar and accommodated on a concave-, spherical- or hemispherical-, or ellipsoid-shaped second mirror support 19.

Planar designs of first mirror 4 and second mirror units 18-*i* are advantageous, so that the focusing is determined solely via the collimator 2, and precise manufacturing of mirrors 4 and mirror units 18-*i* is cost-effective. However, non-planar designs of first mirror 4 and/or second mirror units 18-*i* are also generally possible and must then correspondingly be taken into account when ascertaining the respective object distance of camera 8.

Figure 2:
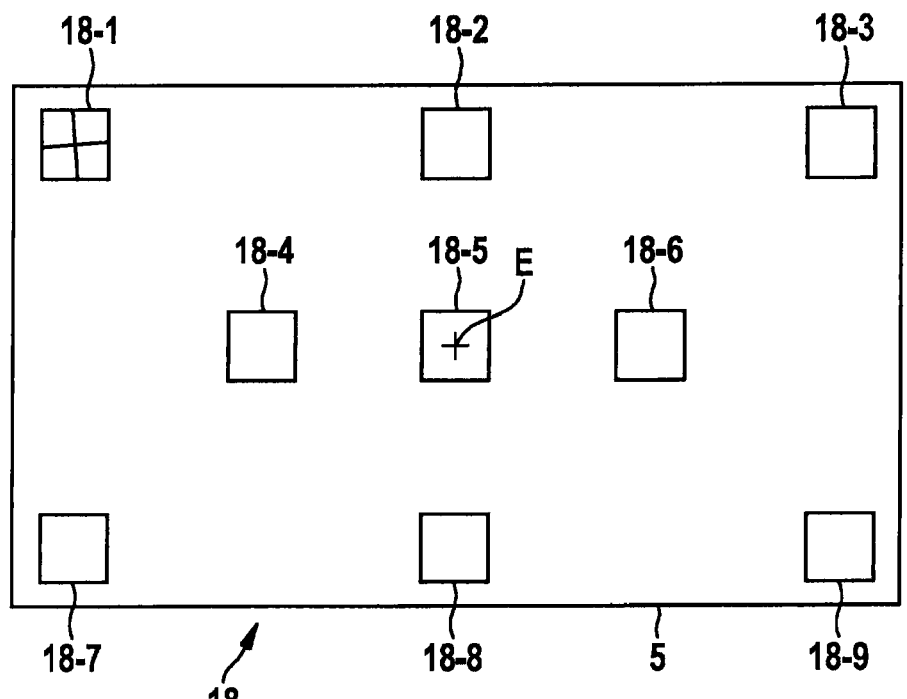
FIG. 2 shows the principle of the fixed second mirror device in a front view.

Individual second mirror units 18-*i* reflect each of incident light paths 16-*i* to entrance pupil 8*a* of the objective of camera 8, whose image sensor (imager chip) 21 thus provides an image which (essentially) corresponds to the front view of second mirror device 5 shown in FIG. 2.

Figure 3:
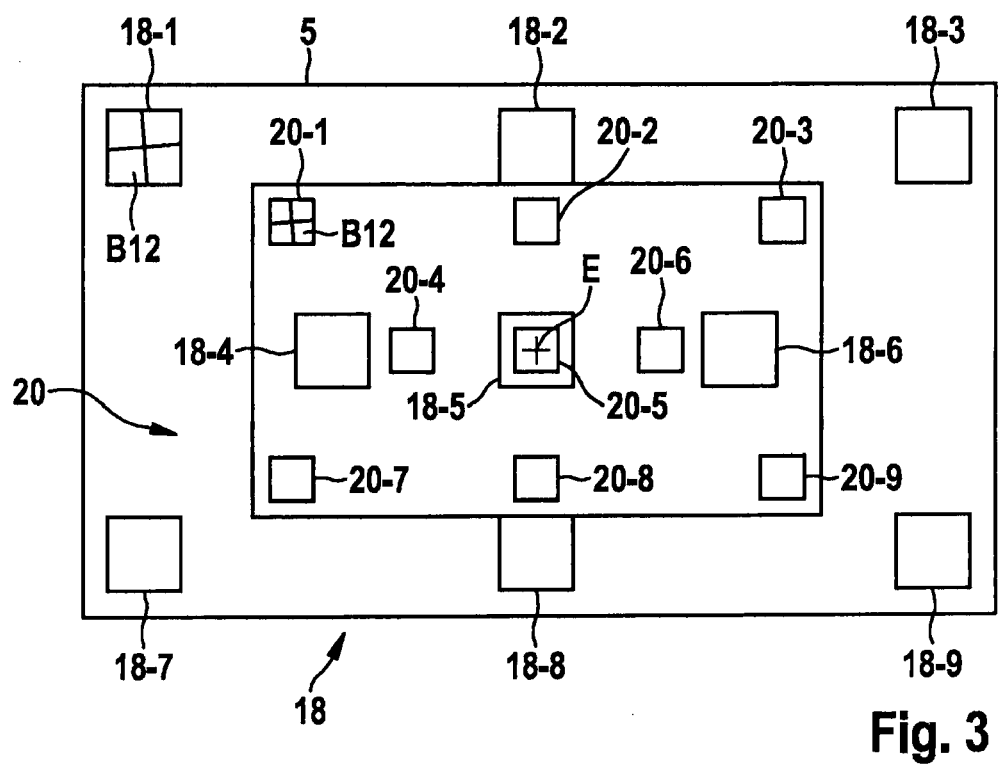
FIG. 3 shows a front view of a fixed second mirror device according to another specific embodiment for the successive measurement of two different cameras.
Figure 4:
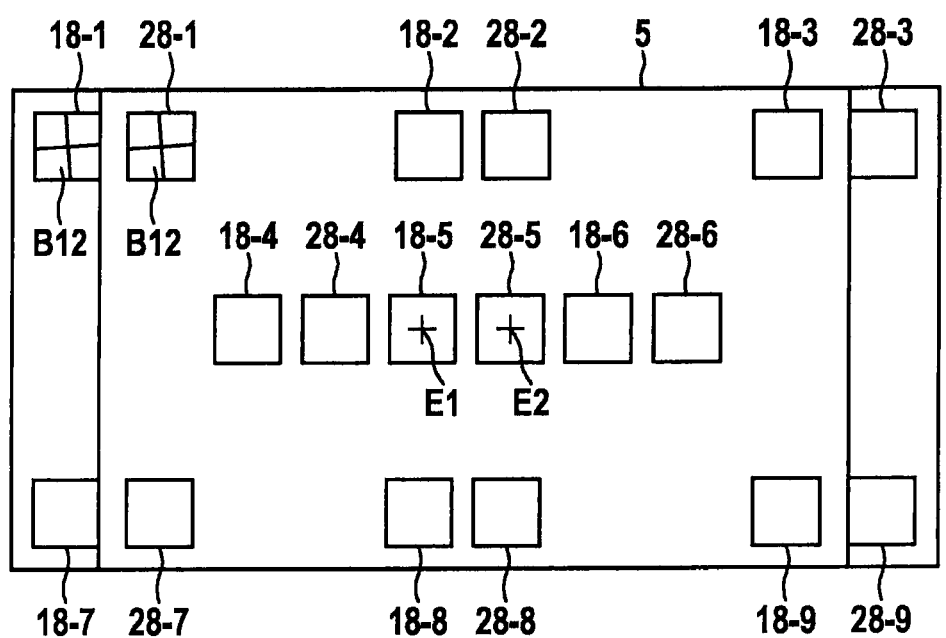
FIG. 4 shows a front view of a fixed second mirror device according to another specific embodiment for measuring a stereo camera device having two individual cameras.

Images B12 of the test pattern at positions of second mirror units 18-*i* are correspondingly illustrated in FIG. 2 and the additional specific embodiments in FIGS. 3 and 4. For the sake of clarity, FIGS. 2 through 4 thus depict the superimpositions of the front view of the second mirror device and the image recorded by image sensor 21 of the camera or generated image signal S1.

Image signal S1 is output to a control and evaluation device 30, which in turn outputs control signals S2 to mirror adjustment device 3 and adjustment device 15. Control and evaluation device 30 is schematically depicted here and may correspondingly also be formed from multiple units for control and evaluation.

Depending on the setting of pivot angles (tilt angles) $\alpha$ about the C-axis and $\beta$ about the D-axis of mirror 4, image B12 of test pattern 12 is thus shown in different horizontal positions (x-axis) and vertical positions (y-axis) of an image signal S1 which is output by camera 8. A matrix arrangement of images B12 of test pattern 12 thus results at the different angle values of $\alpha$ and $\beta$.

Different image field positions in image sensor 21 of camera 8 are thus set via pivot angles $\alpha$ and $\beta$ of mirror adjustment device 3, so that the position and quality may be checked.

Individual second mirror units 18-*i* are advantageously situated in such a way that the entire optical distance from first mirror 4 in its different angle positions via second mirror units 18-*i* to entrance pupil 8*a* of camera 8 is the same for all i. This is achieved via the hemispherical or ellipsoid arrangement of second mirror units 18-*i* on second mirror support 19, since the sum of the distances from first mirror 4 (or the point of intersection of pivot axes C and D in mirror 4) via each of second mirror units 18-*i* to objective 8*a* is constant in such an arrangement.

Collimator accommodation 11, second mirror support 19, and camera support 6 are thus situated in a fixed position relative to each other. They are advantageously accommodated in a frame of measuring device 1. Camera support 6 allows a defined camera position 7 of camera 8 in the optical arrangement.

More complex mirror designs, for example, having more than one fixed mirror device 5 or having two mirrors which are tiltable about various pivot axes, are also generally possible. However, the depicted design is advantageous with respect to the formation of equal optical path lengths via the hemispherical or ellipsoid arrangement of second mirror units 18-*i*.

For a complete measurement of the imaging properties of optical camera 8, its image signals S1 are recorded at various virtual object distances at various positions on image sensor (imager) 21. The various virtual object distances are set by adjustment device 15 of collimator 2 and correspond to real object distances, for example, between 2 m and infinity.

An inner loop and an outer loop are advantageously run through for detecting all values. Preferably, angle settings $\alpha$ and $\beta$ corresponding to the x and y directions in image sensor 21 are run through in the inner loop, and the through-focus scan is carried out via adjustment of collimator 2 in the outer loop. A focus setting of collimator 2 is thus respectively set by adjustment device 15, and all values of $\alpha$ and $\beta$ are subsequently run through for this focus setting, an image signal S1 respectively being recorded. Then, the next setting of adjustment device 15 is subsequently set, in which all angle values $\alpha$ and $\beta$ are successively set and image signals S1 are recorded, and so forth.

The measurements using measuring device 1 may also be carried out under different climatic conditions. Thus, respective measurements using all focus settings and angle settings $\alpha$ and $\beta$ may be carried out for different temperature values and/or humidity values. Tilt designs of mirror 4 for such different temperature conditions and/or climatic conditions are thus technically easily implementable, since second mirror 4 has only a small mass.

Cameras 8 having different aperture angles $\gamma$ may also be used with measuring device 1. The same measuring device 1 may advantageously be implemented for cameras 8 having different aperture angles $\gamma$ solely as a configuration adjustment of the evaluation software for evaluating or processing the image signals S1, without modification or hardware-based adaptation.

FIG. 3 shows a front view of a second mirror device 5 having two mirror sets, i.e., a mirror set 18 made up of mirror units 18-*i*, where i=1 to 9, for a camera 8 having an additional aperture angle $\gamma$, and an additional mirror set 20 made up of mirror units 20-*i*, where i=1 to 9, for an additional camera 8 having a smaller aperture angle $\gamma$. Optical axis E of camera 8 runs symmetrically through both mirror sets 18 and 20, which are thus designed to be symmetrical to each other or are designed for enlarged or reduced images.

In FIG. 3, the outer box of second mirror device 5 thus corresponds to the image sensor 21 of camera 8 having a larger aperture angle; correspondingly, the inner box surrounding mirror units 20-*i* corresponds to image sensor 21 of camera 8 having a smaller aperture angle for the same optical axis E.

FIG. 4 shows a design of second mirror device 5 for measuring stereo camera devices having two cameras, i.e., having two optical axes E1 and E2 which are offset from each other. For this purpose, a shared first adjustable mirror 4 and a shared second mirror device 5, which has a left mirror set 18 for the left camera of the stereo camera device having left second mirror units 18-*i*, where i=1 to 9, and a right mirror set 28 for the right camera having right second mirror units 28-*i*, where i=1 to 9, may in turn be used. Left mirror units 18-*i* are thus situated on a first hemisphere or a first paraboloid of revolution having an optical axis E1, and right mirror units 28-*i* of right camera 8 are situated on a second hemisphere or a second ellipsoid of revolution having an optical axis E2 which is offset for this purpose, all mirror units 18-*i* and 28-*i* being rigidly accommodated in second mirror device 5.

Figure 5:
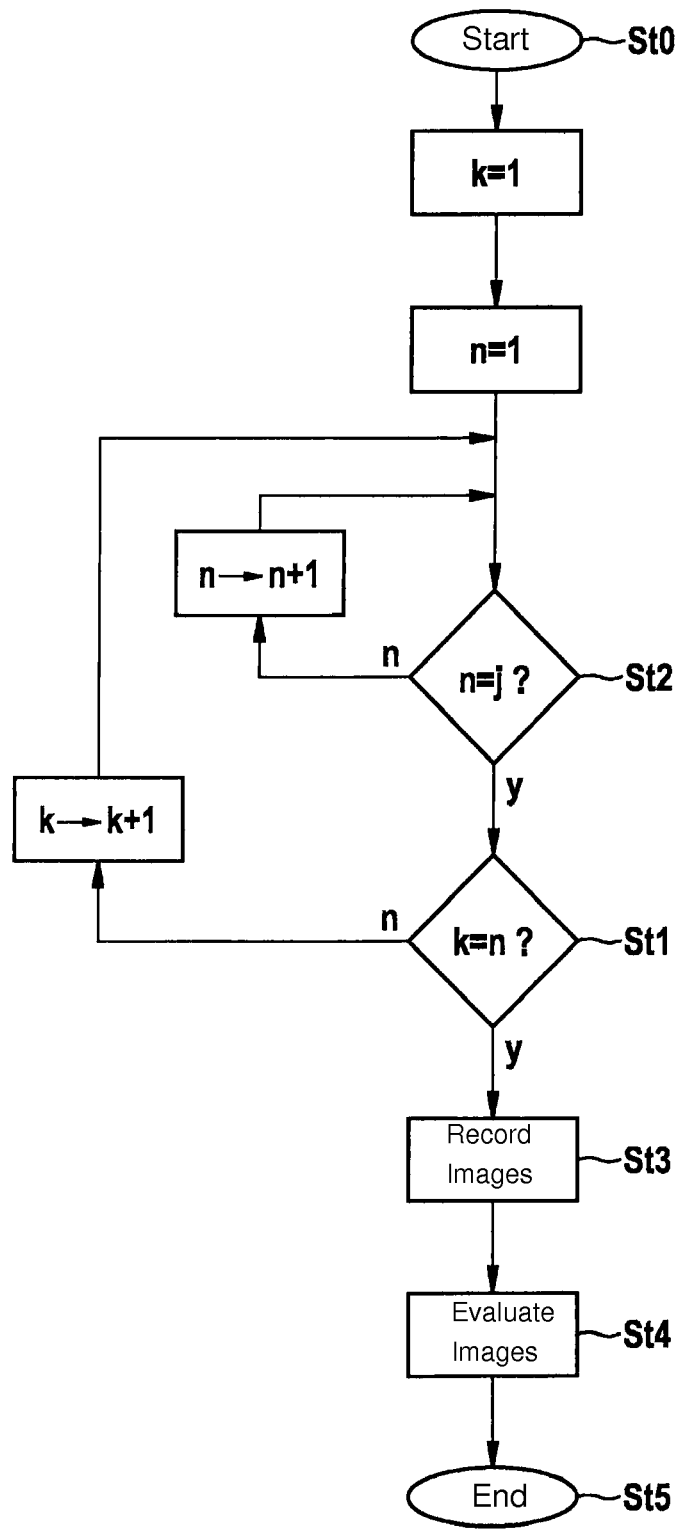
FIG. 5 shows a flow chart of a measurement method according to one specific embodiment.

The measurement method according to the present invention is shown on a flow chart in FIG. 5 by way of example. It starts at step St0, and then an outer loop St1 and an inner loop St2 are run through. Outer loop St1 is used to set different through-focus values. For this purpose, values of a parameter from k=1 to k=n are run through by adjustment device 15 of collimator 2. Inner loop St2 is used to set different tilt angles $\alpha$, $\beta$. For this purpose, a parameter n runs from n=1 to n=j.

The depiction of the loops in FIG. 5 having an initial fixing of parameters k and n to 1 and subsequent increments is only exemplary.

In step St3, images are respectively recorded by camera 8, and image signals S1 are generated which are subsequently evaluated in step St4. The method is ended in step St5 for the specific embodiments in FIG. 2. For measuring cameras 8 having different aperture angles γ, different cameras 8 are consecutively inserted into camera support 6, and the measurement method according to FIG. 5 is carried out. For measuring a stereo camera, after the start in St0, inner and outer loops St1 and St2 may also each be run through for both individual cameras 8 with measurements in St3, followed by a combined evaluation in step St4.

What is claimed is:

1. A device for measuring at least one camera having an image sensor, comprising:
    a camera support for accommodating the at least one camera to be tested in at least one camera position;
    a collimator device for emitting collimator light of a test pattern having different object distances; and
    a mirror system for deflecting the collimator light to the camera position, wherein:
        the mirror system includes:
            at least one first mirror device,
            a mirror adjustment device by which the first mirror device is pivotable into multiple pivot positions, and
            a second mirror device having multiple second mirror units,
            the second mirror units reflect a light emitted by the first mirror device in the multiple pivot positions of the first mirror device to the camera position for imaging the test pattern in different image regions of an image sensor.

2. The device as recited in claim 1, wherein the camera is a fixed-focus camera.

3. The device as recited in claim 1, wherein exactly one second mirror unit is provided for each pivot position of the first mirror device which deflects the light emitted by the first mirror device in the pivot position to the camera position.

4. The device as recited in claim 3, wherein the pivot position corresponds to a position of an entrance pupil of the camera to be recorded.

5. The device as recited in claim 1, wherein the second mirror units of the second mirror device are situated in a fixed position and fixed alignment relative to each other and to the camera support.

6. The device as recited in claim 1, wherein one of the first mirror device and at least one partial mirror of the first mirror device is settable about two non-parallel pivot axes in respective multiple tilt angle positions.

7. The device as recited in claim 6, wherein the non-parallel pivot axes are, orthogonal pivot axes.

8. The device as recited in claim 1, wherein one total length of an optical light path from the collimator device to the camera position is one of the same and lies within a tolerance range in all pivot positions of the first mirror device.

9. The device as recited in claim 1, further comprising:
    an adjustment device by which the collimator device is focusable, the adjustment device setting one of different focuses and object distances for emitting at least one of parallel light and light cones of the test pattern.

10. The device as recited in claim 9, wherein the collimator device includes the test pattern which is adjustable by the adjustment device, an optics device, and an illumination device for illuminating the test pattern in one of transmission and reflection.

11. The device as recited in claim 9, further comprising:
    a control and evaluation device for recording an image signal generated by the camera and for outputting a control signal for setting different pivot positions of the first mirror device and one of different focuses and object distances of the light-emitting device, wherein the control and evaluation device ascertains a respective contrast from image signals generated in the pivot positions and one of the focuses and the object distances.

12. The device as recited in claim 11, wherein the control and evaluation device performs the ascertaining by calculating a modulation transfer function.

13. The device as recited in claim 1, wherein the second mirror device includes at least one mirror set, each mirror set respectively having multiple second mirror units that are respectively situated in one of a hemispheric arrangement and a rotationally ellipsoid arrangement to each other.

14. The device as recited in claim 13, wherein the multiple mirror units are planar.

15. The device as recited in claim 13, wherein the second mirror device has at least two mirror sets, each mirror set respectively having multiple second mirror units for measuring cameras having different aperture angles, the second mirror units of a mirror set for a camera having a larger aperture angle being farther apart than the second mirror units of a mirror set for a camera having a smaller aperture angle.

16. The device as recited in claim 13, wherein the device measures stereo camera systems have two optical axes which are offset from each other, the second mirror device having two mirror sets, the second mirror units of each mirror set being respectively situated in at least one of a hemispherical arrangement and a rotationally paraboloid arrangement to one of the two optical axes.

17. A measuring system, comprising:
    a device for measuring at least one camera having an image sensor, comprising:
        a camera support for accommodating the at least one camera to be tested in at least one camera position;
        a collimator device for emitting collimator light of a test pattern having different object distances; and
        a mirror system for deflecting the collimator light to the camera position, wherein:
            the mirror system includes:
                at least one first mirror device,
                a mirror adjustment device by which the first mirror device is pivotable into multiple pivot positions, and
                a second mirror device having multiple second mirror units,
            the second mirror units reflect a light emitted by the first mirror device in the multiple pivot positions of the first mirror device to the camera position for imaging the test pattern in different image regions of an image sensor; and
        the at least one camera accommodated in the camera support and including the image sensor, wherein the at least one camera outputs image signals.

18. A method for measuring at least one camera using a device for measuring the at least one camera having an image sensor, the device including:
    a camera support for accommodating the at least one camera to be tested in at least one camera position;
    a collimator device for emitting collimator light of a test pattern having different object distances; and a mirror system for deflecting the collimator light to the camera position, wherein:
the mirror system includes:
at least one first mirror device,
a mirror adjustment device by which the first mirror device is pivotable into multiple pivot positions, and
a second mirror device having multiple second mirror units,
the second mirror units reflect a light emitted by the first mirror device in the multiple pivot positions of the first mirror device to the camera position for imaging the test pattern in different image regions of an image sensor, the method comprising:
accommodating the at least one camera having the image sensor in the camera support;
setting one of different object distances and focuses of the collimator device for emitting the collimator light of the test pattern having different object distances; and
setting different pivot positions of an adjustable first mirror device situated in an optical path between the collimator device and the camera in such a way that light reflected by the first mirror device in its pivot positions is deflected successively onto different second mirror units of the second mirror device which deflect the light respectively to the camera to be measured, wherein total lengths of the optical path from the collimator device to the camera are the same in all pivot positions of the first mirror device, and wherein the test pattern is imaged in the different pivot positions in different image regions of the image sensor.

19. The method as recited in claim 18, wherein the one of the different object distances and the focuses and the different pivot positions are respectively set successively in an inner loop and an outer loop successively, the different settings of the inner loop being respectively set successively for every setting of the outer loop.

20. The method as recited in claim 18, wherein the image signals output by the camera at the different object distances and at the different pivot positions of the first mirror device are subsequently evaluated based on their contrast.

21. The method as recited in claim 20, wherein the image signals are evaluated while forming a modulation transfer function.

* * * * *